United States Patent
Malapert et al.

[11] Patent Number: 5,918,517
[45] Date of Patent: Jul. 6, 1999

[54] METHOD AND APPARATUS FOR CUTTING BLOCKS AND PANELS OF CELLULAR PLASTIC

[75] Inventors: Philippe Malapert, Saint Juire; Jacques Crouet, Paris, both of France

[73] Assignee: Societe Croma, Paris, France

[21] Appl. No.: 08/754,628

[22] Filed: Nov. 21, 1996

Related U.S. Application Data

[63] Continuation of application No. 08/302,955, Sep. 12, 1994, abandoned, which is a continuation of application No. 07/957,949, Oct. 8, 1992, abandoned.

[51] Int. Cl.⁶ .................................. B26D 3/00; B26D 7/10
[52] U.S. Cl. .......................... 83/171; 83/76.6; 83/651.1; 83/870
[58] Field of Search ..................................... 83/76.1, 76.6, 83/76.9, 171, 651.1, 870, 874

[56] References Cited

U.S. PATENT DOCUMENTS

| | | |
|---|---|---|
| 4,018,116 | 4/1977 | Treffner et al. . |
| 4,683,791 | 8/1987 | Demont . |
| 4,683,792 | 8/1987 | Demont . |
| 4,915,000 | 4/1990 | MacFarlane . |
| 5,181,503 | 1/1993 | Fish et al. . |

FOREIGN PATENT DOCUMENTS

| | | |
|---|---|---|
| 0 263 767 | 4/1988 | European Pat. Off. . |
| 805836 | 12/1958 | France . |
| 28 00 902 | 11/1978 | Germany . |

*Primary Examiner*—Eugenia Jones
*Attorney, Agent, or Firm*—Armstrong, Westerman, Hattori, McLeland & Naughton

[57] ABSTRACT

An apparatus for cutting any one of blocks and panels of cellular plastics into various shapes. The cellular plastic is held on a stationary platform around which a movable frame is affixed to two slides. The movable frame moves on two horizontal rails to effect cutting in the x-direction. Cutting is done with a hot wire affixed to two slides which move together vertically on vertical rails along the moveable frame to effect cutting in the y-direction. Stepping motors are driven by a computer to provide for displacement of the hot wire. Each motor includes a pinion which is mounted on a shaft directly engaging gear-racks parallel to the rails, to effect cutting of various shapes defined by the equation $y=f(x)$.

3 Claims, 1 Drawing Sheet

METHOD AND APPARATUS FOR CUTTING BLOCKS AND PANELS OF CELLULAR PLASTIC

This is a continuation of application Ser. No. 08/302,955 filed Sep. 12, 1994, abandoned, which is a continuation of Ser. No. 07/957,949, filed Oct. 8, 1992, now abandoned.

The present invention concerns a method and apparatus for cutting variously shaped parts out of cellular plastic panels and blocks, in particular for cutting letters, signs or logos from extruded polystyrene, and more specifically the invention relates to an improved method and apparatus for the manufacture of polystyrene parts of complex shapes of various dimensions.

The presently most commonplace procedure in this field is manual cutting using a hot wire. This procedure makes it possible to obtain any shape starting from a template placed on the panel to be cut. However, this procedure requires an experienced operator, is prone to give irregular cutting, and moreover is unsuitable for mass production.

Consequently, it has already been suggested that cutting be performed with a hot wire controlled and driven by motors. The wire is held in place at the end of two parallel horizontal rods, the polystyrene panel being stationary and positioned between these two rods. However, many problems arise when such a procedure is carried out. There is a narrow limit on the maximum dimension of the cutting, because the two rods cannot be made so long that they would lose rigidity. Moreover the cut-out parts drop by their own weight, due to the horizontal position of the panels, and interfere with the cutting operation.

While the latter drawback can be remedied with a machine wherein the panel being cut is held vertically, the size limitation does remain and it is also not easy to affix the panel.

Now an improved system has been discovered, which is the object of the present invention, in which this cutting process is carried out with a hot wire, which process overcomes the drawbacks of the prior art methods and in particular allows a volume of large dimension to be cut, in which process the hot wire meets with no obstacle whatever. Also, using a cooling system which is an optional part of the present invention, it has been found that the apparatus of the invention makes it possible to obtain cut parts having neat and smooth cut sides, and it is possible to cut simultaneously a large number of panels to produce identical parts.

DESCRIPTION OF PREFERRED EMBODIMENT

Figure 1:
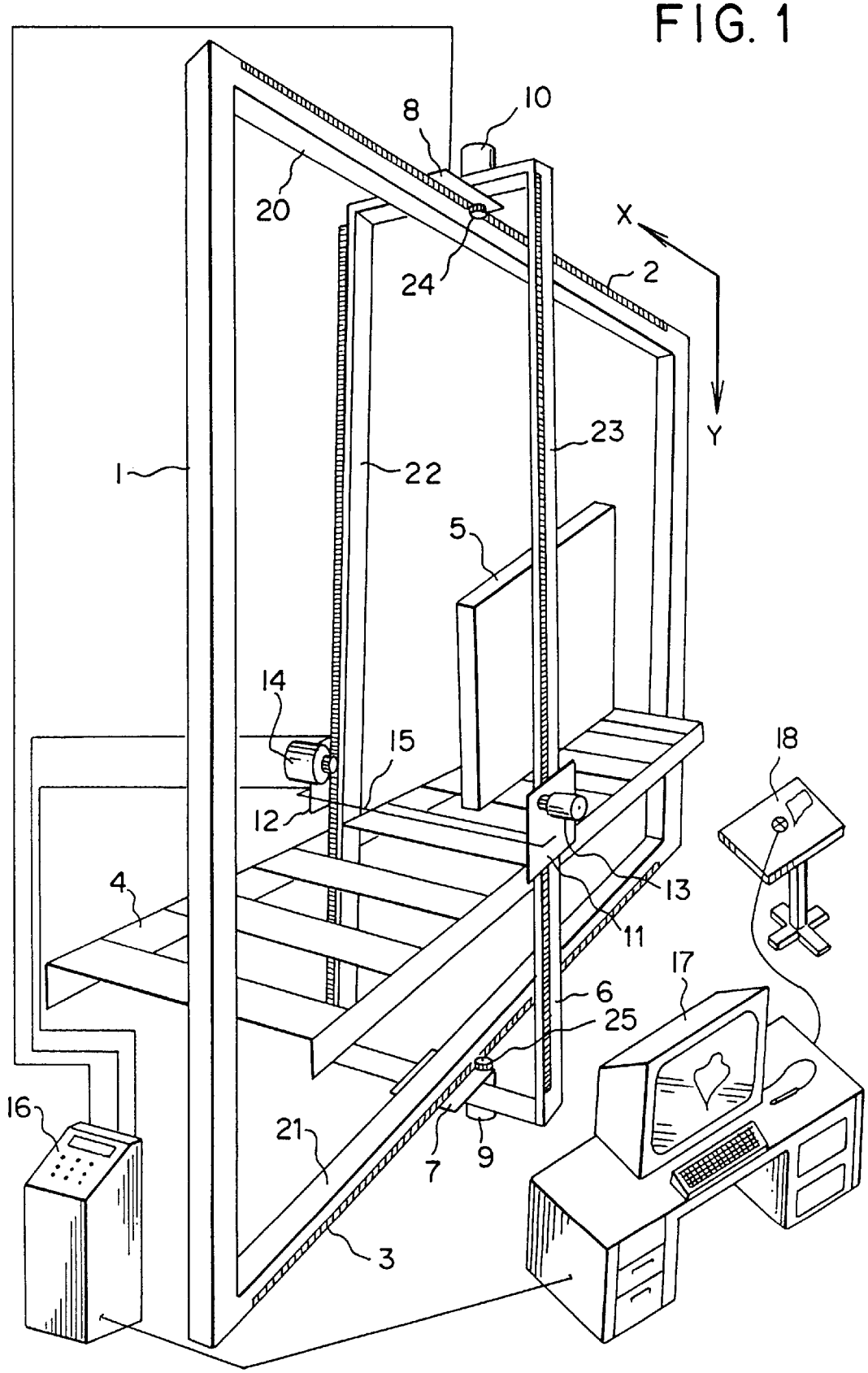
FIG. 1 is a partly exploded perspective view of an apparatus according to the invention.

In practice, the following is advantageously carried out:

A wire heated resistively by a low-voltage source is affixed to two carriages simultaneously moving along the two sides of a frame, resulting in displacement along the y-axis.

This frame itself is affixed to two carriages driven into horizontal displacement by two synchronized motors, for example, pulse motors, resulting in displacement along the x-axis.

The panels to be cut are placed vertically and are kept in this manner on a horizontal bench inside the movable frame and the stationary frame.

The process, from numerical shape control to motor control, is managed by computer.

The invention and its advantages are further explained below by an illustrative embodiment to which the invention is not restricted, and which is shown in the attached drawing.

By reference to the drawing, the apparatus of the invention for cutting cellular plastic panels by a hot wire includes the following components:

A stationary frame (1), with guide rails (omitted from drawing for clarity) affixed to the uppermost and lowermost horizontal parts (20), (21) of the frame, Gear racks (2) and (3) laterally affixed in parallel to the horizontal parts or members (20, 21), A platform (4), i.e., plate, affixed horizontally to two vertical posts. The position of the platform may be adjusted according to the dimension of the panels to be cut. This platform or plate supports the panel(s) (5) which are in a vertical position, A movable frame (6), having left and right vertical members (22), (23), is affixed to slides (7) and (8) which are movable on the horizontal members of the stationary frame (1), Two stepping or pulse motors (9) and (10) each affixed to the slides. Pinions (25), (24) of stepping or pulse motors (10), (9), respectively, are located on respective shafts of the stepping or pulse motors and drive the gear racks directly. These motors rotate in mutually opposite directions and are synchronized by a control system (16) to advance the movable frame (6) along the x-axis, Two other guide rails, also omitted for clarity, affixed to the two vertical members of the movable frame (6), Two slides (11) and (12) equipped with two stepping or pulse motors (13) and (14) move by a process identical to the motion of slides (7) and (8), ensuring motion along the y-axis, A hot tungsten wire (15) links the slides (11) and (12). The wire is heated by Joule effect from the control system (16), A flexible steel blade (omitted) which is perpendicular to the wire keeps the wire (15) in place. If drag is encountered in the movement of the wire, the blade deforms and actuates a switch contact which shuts off the heating of the wire (by turning off its low-voltage power) as well as the control by the motors, By means of flexible tubes, compressed air is provided to each of the slides (11) and (12). This air is directed by a tube (omitted) onto the two segments of the wire that are outside the cellular plastic during the cutting process. Since contact between the hot wire and the cellular plastic being cut causes cooling of the hot wire, the temperature of the wire segments which are outside the cellular plastic is higher than the temperature of the wire segment which is inside the cellular plastic. The cooling of the wire segments outside the cellular plastic ensures a uniform temperature along the entire length of the wire, in the material being cut as well as in air. As a result, the cut is perfectly clean and wire life is greatly extended.

The motors, the heating and the ventilation of the wire are controlled from a computer (17).

The shape to be cut is drawn with specialized commercial software, in particular using a plotter (18). The computer file so made is processed by another software dedicated to this cutting apparatus and taking into account the particulars of hot-wire cutting. Thereupon this software controls motion along the x and y axes of the stepping motors. The hot wire can move unopposed within a volume determined by the two frames (1) and (6) along any curve y=f(x).

The apparatus of the invention may comprise counterweights inside the two vertical parts of the frame (6) for ensuring easy displacement of the slides (11) and (12) through a pulley and cable system.

In the apparatus of the invention, the hot wire cutting means may be replaced by milling means, a laser cutting beam or a jet of water.

We claim:

1. An apparatus for cutting cellular plastic panels, comprising:

a stationary frame having uppermost and lowermost horizontal members;

a mobile frame perpendicular to said stationary frame, wherein said mobile frame is movable on said stationary frame and is guided by said stationary frame, and wherein said stationary frame is arranged approximately vertically, said mobile frame being horizontally mobile and having left and right vertical members being arranged to a left side of said stationary frame and to a right side of said stationary frame, respectively, each of said uppermost and lowermost horizontal members and said right and left vertical members being equipped with a rack;

a first pair of slides, with each slide of said first pair of slides being attached to a lower surface and to an upper surface of said uppermost and lowermost horizontal members, respectively, of said mobile frame, each of said slides being equipped with a pulse motor, and each of said pulse motors having a pinion which cooperates with said rack of said uppermost and lowermost horizontal members of said stationary frame to which said pinion corresponds;

a second pair of slides mounted on said right and left vertical members of said mobile frame, respectively, each slide of said second pair of slides being equipped with a pulse motor, and each of said pulse motors of said second pair of slides having a pinion which cooperates with said rack of said left and right vertical members of said mobile frame to which said pinion corresponds;

a hot wire stretched between said second pair of slides; and a horizontal plate arranged between said left and right vertical members of said mobile frame, and said uppermost and lowermost horizontal members of said stationary frame;

a computer connected to said pulse motors for controlling said pulse motors to thereby control movement of said mobile frame and said hot wire; and said stationary frame being situated in said mobile frame in such a way that said hot wire moves unobstructed in a volume envelope defined by:
  (a) an inside of said mobile frame in said movement of said mobile frame in relation to said stationary frame;
  (b) an inside of said stationary frame; and
  (c) said horizontal plate.

2. The apparatus according to claim 1, wherein said left and right vertical members of said mobile frame move in two parallel planes along said stationary frame.

3. The apparatus according to claim 1, wherein said pulse motors driving said mobile frame are mounted in opposition and turn in opposite directions.

* * * * *